UNITED STATES PATENT OFFICE.

ANDRES G. LUNDIN, OF BOSTON, MASSACHUSETTS, ASSIGNOR TO THE UNITED STATES STEEL COMPANY, OF SAME PLACE.

PROCESS OF MAKING STEEL CASTINGS.

SPECIFICATION forming part of Letters Patent No. 648,510, dated May 1, 1900.

Original application filed January 19, 1899, Serial No. 702,741. Divided and this application filed October 26, 1899. Serial No. 734,830. (No specimens.)

*To all whom it may concern:*

Be it known that I, ANDRES G. LUNDIN, a subject of the King of Sweden and Norway, residing in Boston, in the county of Suffolk and State of Massachusetts, have invented a certain new and useful Process of Making Steel Castings, of which the following is a specification, being a division of application Serial No. 702,741, filed January 19, 1899.

This invention relates to the manufacture of steel castings from steel scrap, whereby a new or improved description of steel possessing toughness and hardness to an unusual degree and other valuable peculiarities is produced.

The mode of practicing my invention is as follows: First, the steel scrap is placed in a crucible in a furnace and melted to a boiling-point—say about 4,000° Fahrenheit—or it may be melted by the open-hearth process; second, a small quantity of crumbled or broken copper is thrown into the mass in a crucible; third, a wait of from fifteen to thirty minutes is made in order to allow the copper to become completely melted and mixed with the molten metal; fourth, a small quantity or percentage of ferrosilicon containing, preferably, twelve (12) per cent. of silicon is crumbled and placed in the molten mass of metal; fifth, a wait of, say, ten minutes is made in order to give the ferrosilicon time to melt and mix with the molten mass; sixth, a small quantity of ferromanganese, rich in manganese and containing, say, eighty per cent. of manganese, is crumbled and placed with a small portion of crumbled or broken aluminium and the mixture dropped into the molten mass of metal, where it quickly melts, and, seventh, the molten mass of metal or alloy is poured into the mold.

The process comprising the above steps is particularly adapted for the production of large or heavy castings.

In practice I find it advisable to heat the ferrosilicon and the copper before throwing them into the molten mass in the crucible in order that the portion of the mass next such ingredients may not become chilled and the process retarded. Thus the preliminary heating of these ingredients is to a comparatively-low temperature, and of course not to a melting-point, and it may be done, if desired, while the scrap is melting.

The proportions used in the above-described process are as follows: steel scrap, one hundred pounds; copper, one to four pounds; ferrosilicon, one and one-half to two and one-half pounds; ferromanganese, two to eight ounces; aluminium, three pounds or less.

Having thus fully described my invention, what I claim, and desire to secure by Letters Patent, is—

1. The process herein described for manufacturing steel castings, which consists in heating steel scrap in a furnace and melting the same to substantially a boiling-point; inserting in the molten metal a small quantity of copper; allowing sufficient time for the copper to become thoroughly melted and mixed with the molten metal; inserting in the molten metal a small percentage of ferrosilicon; allowing sufficient time for the ferrosilicon to become melted and mixed with the molten metal; inserting in the molten metal substantially simultaneously small quantities of ferromanganese and aluminium; and pouring the molten mass of metal or alloy into a mold in the usual manner, substantially as described.

2. The process herein described for manufacturing steel castings, which consists in heating steel scrap in a furnace and melting the same to substantially a boiling-point; heating to a moderate degree a small quantity of copper and then inserting the same in the molten metal; allowing sufficient time to elapse for the copper to become melted and mixed with the molten metal; heating to a moderate degree a small percentage of ferrosilicon and then inserting the same in the molten metal; allowing sufficient time for the ferrosilicon to become melted and mixed with the molten metal; inserting in the molten metal substantially simultaneously small quantities of ferromanganese and aluminium; and pouring the molten mass of metal or alloy into a mold in the usual manner, substantially as set forth.

ANDRES G. LUNDIN.

Witnesses:
HENRY W. WILLIAMS,
A. N. BONNEY.